Jan. 28, 1936.　　　　C. J. OTT　　　　2,028,915
VEGETABLE PEELER AND SLICER
Filed Aug. 19, 1935
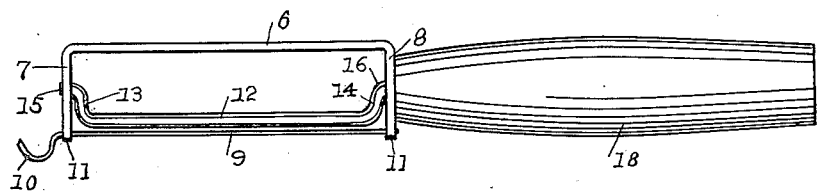
Fig. 1
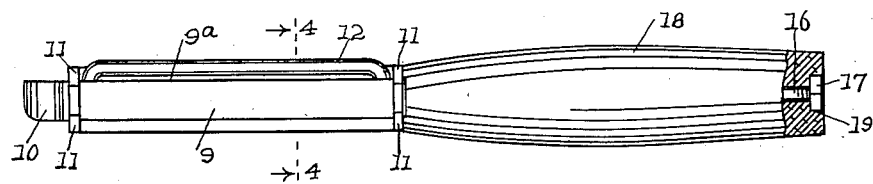
Fig. 2
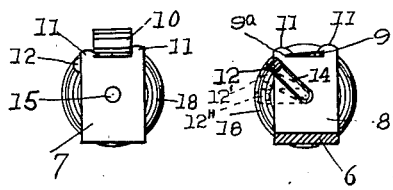
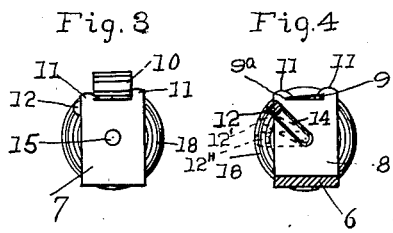
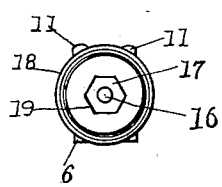
INVENTOR,
Charles J. Ott.
BY David E. Lain,
ATTORNEY.

Patented Jan. 28, 1936

2,028,915

UNITED STATES PATENT OFFICE 2,028,915

VEGETABLE PEELER AND SLICER

Charles J. Ott, Bellingham, Wash.

Application August 19, 1935, Serial No. 36,788

1 Claim. (Cl. 30—20)

My invention relates to improvements in vegetable peelers and slicers, and has for an object to provide a vegetable peeler and slicer having an adjustable gage to limit the thickness of the peeling or slice being cut away.

Another object of my improvement is to provide a handle for the device suitable for also serving to adjust and retain the gage in desired positions.

Other objects of my improvement will appear as the description proceeds.

I attain these and other objects of my improvement with the mechanism illustrated in the accompanying sheet of drawing, forming a part of this specification, in which Figure 1 is a front side elevation of my mechanism, Fig. 2 is a bottom plan view thereof, Fig. 3 is a front end elevation of the mechanism, Fig. 4 is a cross-section on the line 4—4 of Fig. 2 revolved through an angle of 90° and Fig. 5 is the rear end elevation of the mechanism.

Similar characters refer to similar parts throughout.

Certain parts are broken away to show other parts hidden thereby.

With more particular reference to the designated parts: The U-shape blade holder has the back 6 and front end 7, and rear or handle end 8. Deep recesses in the outer edges of the ends 7 and 8 provide the four lugs 11.

The blade 9 has the cutting edge 9ª and the curved gouge end 10. The blade is disposed in the said recesses with the cutting edge forward and the curved gouge end 10 extended outside of the holder end 7. With the blade in place in the said recesses the lugs 11 are hammered toward each other over the edges of the blade to firmly clamp and retain the blade in operative position.

The gage has the rod 12 with bent-over ends 13 and 14 disposed in the same plane. The bent-oven end 13 has the bent-over axle end 15, while the bent-over end 14 has the bent-over axle and handle-rod end 16. The axle 15 and axle and handle rod 16 are aligned and parallel with the rod gage 12.

There are centrally disposed bearing holes in the holder ends 7 and 8 through which the axles 15 and 16 are extended to mount the gage 12 for oscillation parallel with the blade edge 9ª.

The handle 18 has a centrally disposed longitudinal hole and a nut-shape recess 19 in its outer end. The rod 16 is extended through the handle hole, the nut 17 is disposed in the recess 19 and the handle 18 is revolved to engage the threaded outer end of the rod 16 threadwise in the nut 17, thus causing the inner end of the handle 18 to bear on the holder end 8 to mount the handle 18, and set the bent-over gage end 14 against the holder end 8 to retain the gage 12 in desired position.

To reset the gage 12 in another position, as at 12' or 12" the handle 18 is revolved to unscrew the nut 17 and then revolved in the other direction to screw on the nut 17 while the gage 12 is being held in the other desired position. The friction between the front end of the handle 18 and the holder end 8 under screw pressure, as explained, is sufficient to retain the handle in operative position and the gage in any desired position relative to the blade edge 9ª.

The illustrated solid-line position of the gage 12 is for making very thin peelings. Thicker peelings are provided for by setting the gage at 12'; and slicing may be done with the blade when the gage is set at 12", and also in other positions farther from the edge of the blade.

The hooked outer blade end 10 is useful for gouging out eyes, specks and the like from vegetables.

Having thus disclosed my invention, what I claim as new therein and desire to secure by Letters Patent is,—

A device of the kind described including, a blade holder, a blade having a cutting edge fastened in the said holder, a gage including a gage rod having a bent-over outer end with an axle thereon and a bent-over inner end with an axle handle rod thereon mounted for oscillation in bearings in the said holder to dispose the gage rod parallel with the said cutting edge and at adjustable spaces therefrom, a handle having a longitudinal hole therethrough and a nut recess in the outer end thereof disposed with its inner end bearing on the said blade holder with the said axle handle rod extended through the longitudinal handle hole, and a nut engaged in the said handle recess and with a thread on the outer end of the said axle handle rod.

CHARLES J. OTT.